United States Patent
Vetterick et al.

[19]

[11] Patent Number: 6,065,486

[45] Date of Patent: *May 23, 2000

[54] TWO PHASE FLOW DISPERSION DEVICE

[75] Inventors: Richard C. Vetterick, Akron; George B. Watson, North Canton, both of Ohio

[73] Assignee: McDermott Technology, Inc., New Orleans, La.

[*] Notice: This patent is subject to a terminal disclaimer.

[21] Appl. No.: 08/699,764

[22] Filed: Aug. 20, 1996

Related U.S. Application Data

[63] Continuation-in-part of application No. 08/546,881, Oct. 23, 1995, Pat. No. 5,576,495.

[51] Int. Cl.[7] ............................................. F16T 1/38
[52] U.S. Cl. ...................... 137/171; 137/561 A; 137/599
[58] Field of Search ................... 137/171, 561 A, 137/599; 406/108, 109, 154, 171, 172

[56] References Cited

U.S. PATENT DOCUMENTS

| | | | |
|---|---|---|---|
| 2,628,086 | 2/1953 | Cutler | 261/69 |
| 2,703,013 | 3/1955 | Wildhack | 73/357 |
| 3,345,803 | 10/1967 | Smith | 137/171 X |
| 3,408,866 | 11/1968 | Gibson et al. | 73/228 |
| 3,416,547 | 12/1968 | Glenn, Jr. et al. | 137/171 X |
| 3,689,833 | 9/1972 | Hogg | 324/71 |
| 4,144,754 | 3/1979 | Pitts, Jr. et al. | 73/205 D |
| 4,231,262 | 11/1980 | Boll et al. | 73/861.04 |
| 4,261,196 | 4/1981 | Scheid, Jr. | 73/32 R |
| 4,324,143 | 4/1982 | Olson | 73/861.62 |
| 4,397,190 | 8/1983 | Hulin | 73/861.04 |
| 4,501,156 | 2/1985 | Kretschmer et al. | 73/861.04 |
| 4,559,835 | 12/1985 | De Baun | 73/861.66 |
| 4,574,643 | 3/1986 | Scott et al. | 73/861.04 |
| 4,574,837 | 3/1986 | Aggour et al. | 137/561 A |
| 4,655,647 | 4/1987 | Bock | 406/154 X |
| 4,776,210 | 10/1988 | Baillie et al. | 73/61.1 R |
| 4,800,921 | 1/1989 | Greebe | 137/561 A |
| 4,824,614 | 4/1989 | Jones | 137/561 A X |
| 4,836,032 | 6/1989 | Redus et al. | 73/861.04 |
| 4,856,344 | 8/1989 | Hunt | 73/861.04 |
| 4,987,918 | 1/1991 | Barnadas | 137/171 |
| 5,218,985 | 6/1993 | Berger et al. | 137/171 X |
| 5,351,520 | 10/1994 | Buguet | 73/7 |
| 5,396,806 | 3/1995 | Dechene et al. | 73/861.04 |
| 5,400,657 | 3/1995 | Kolpak et al. | 73/861.04 |
| 5,415,195 | 5/1995 | Stoy et al. | 137/561 A X |
| 5,576,495 | 11/1996 | Vetterick | 73/861.04 |

*Primary Examiner*—John Rivell
*Attorney, Agent, or Firm*—Robert J. Edwards; Daniel S. Kalka

[57] ABSTRACT

An apparatus for dispersing the relative flows of a separated two phase flow using a nozzle positioned immediately downstream from a bend in a pipe. The inlet of the nozzle is adjacent an external wall of the pipe and the outlet of the nozzle is substantially on a longitudinal axis of the pipe. The dense phase is collected and transported through the nozzle back into the center of the pipe for uniform mixing and dispersion.

2 Claims, 6 Drawing Sheets

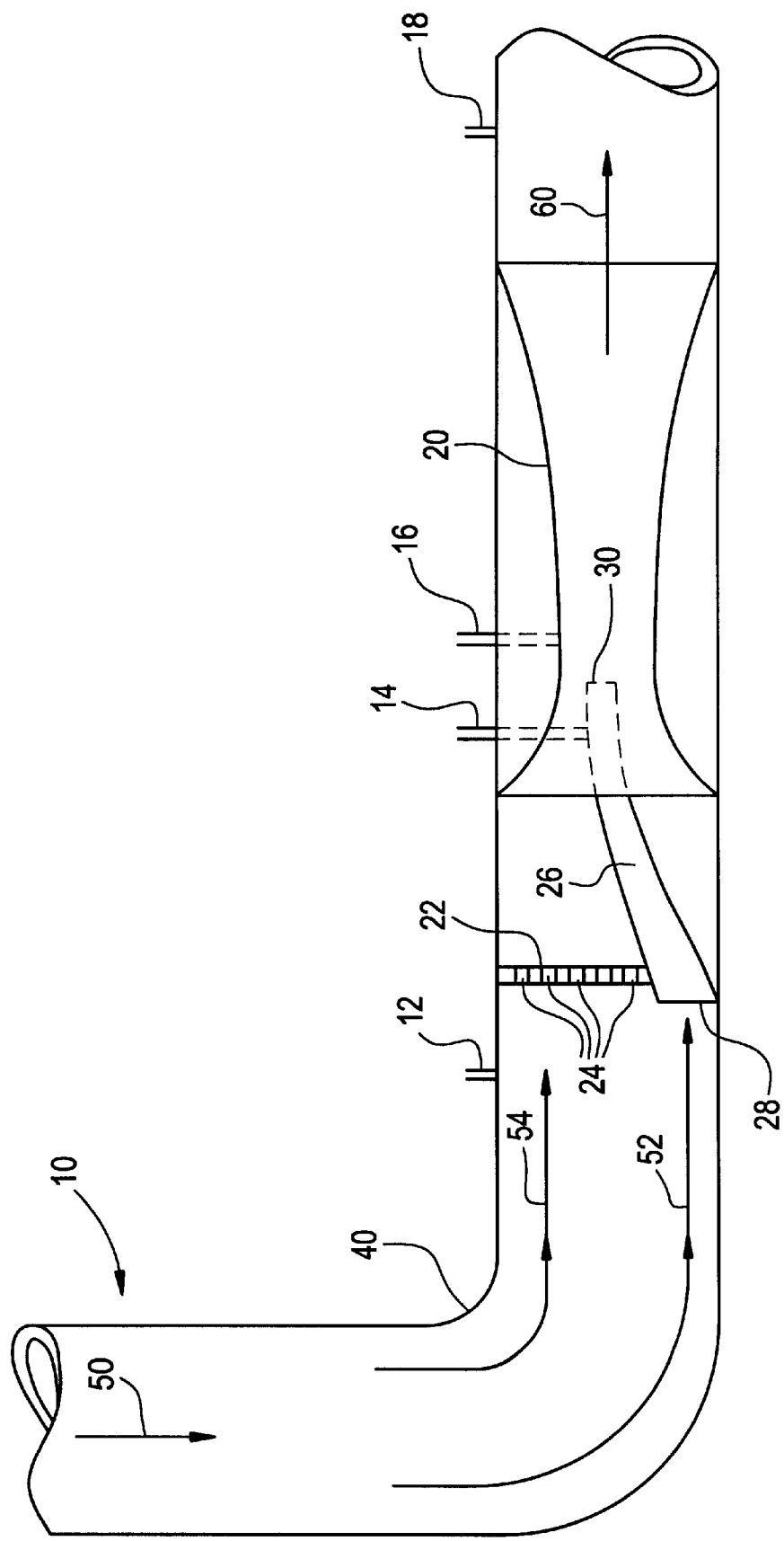

TWO PHASE FLOW DISPERSION DEVICE

This application is a Continuation-In-Part of patent application Ser. No. 08/546,881 filed Oct. 23, 1995 now U.S. Pat. No. 5,576,495.

BACKGROUND OF THE INVENTION

1. Field of the Invention

The present invention relates in general to a fluid flow measurement and dispersion arrangement and, more particularly, to an arrangement for measuring a two phase flow and an arrangement for mixing and dispersing a two phase flow.

2. Description of the Related Art

The ability to accurately measure and disperse a two phase fluid flow is hampered by problems related to the homogeneity or non-homogeneity of the two phase mixture and the resulting combined density of the mixture. Unsatisfactory attempts to measure two phase flow have been made with magnetic flux meters, pneumatic orifices, ultrasonics and electromagnetic wave instruments.

A flow measuring apparatus having a bend along its conduit is disclosed in U.S. Pat. No. 2,628,086 to Cutler, however no particles in suspension are contemplated as part of the fluid flow. FIG. 2 in U.S. Pat. No. 2,703,013 also shows a bend in a flow conduit, and further, the use of pressure measurements to calculate flow. The use of tapping fluid from one location is described in U.S. Pat. No. 3,689,833, the second location being in the throat of a venturi. The use of curved conduit and flow meter, specifically for taking advantage of centrifugal flow for a multi-phase fluid flow meter is disclosed in U.S. Pat. No. 4,144,754.

The taking of measurements at multiple locations along a flow stream in a flow meter is disclosed in the U.S. Pat. No. 4,231,262.

U.S. Pat. No. 4,261,196 also utilizes a bend in a conduit for multi-phase fluid.

The mass stream of a dusty solid fuel can be measured according to U.S. Pat. No. 4,501,156. This patent also teaches the use of a bend in the conduit of the measuring apparatus as well as the taking of measurements at multiple locations along the flow stream.

U.S. Pat. No. 4,559,835 discloses the use of a partitioned section of a flow conduit in a flow measuring probe.

Presently, there is no known flow meter that can measure the solid phase flow in a two phase (gas and powdered solids, gas and liquid, or liquid and fine solids) medium.

While there are a number of ways to re-entrain separated material back into a pneumatic transport system like diffusers, impellers, turbulators, baffles, etc., these systems either require energy or produce excessive energy loss.

There still exists a need for a device to uniformly disperse a two phase flow. Preferably such a device would not require energy to accomplish the dispersion. It would operate effectively, efficiently, and economically.

SUMMARY OF THE INVENTION

It is one object of the invention to provide a two phase flow meter which is particularly suited for measuring pulverized coal flowing in gas along a conduit or for measuring liquid flowing in gas along a conduit.

In accordance with the invention, a bend is provided in a conduit, a perforated plate downstream of the bend spans the conduit and passes predominately gas having a low concentration of particles or liquid so that through the action of centrifugal force, the particles or liquid become concentrated at the outside of the bend. A nozzle having an inlet end, proximate to the outer portion of the conduit, receives the high particulate or liquid concentration and channels it radially inwardly and in a downstream direction toward a venturi throat. No portion of the perforated plate extends into the nozzle so that the high concentration of dense phase material is injected into the center of the venturi throat. Four pressure sensors are strategically located along the conduit for taking differential pressure measurements which can be used to measure the relative flow of gas and the solid or liquid phase material.

Another object of the present invention is to provide a device for dispersion of a two phase flow such as pulverized coal in air.

Still another object of the present invention is to provide a two phase flow dispersion device which is simple in design, rugged in construction and economical to manufacture.

In accordance with the present invention, means are provided immediately downstream of a bend in a pipe or conduit where any solids or liquids with a tendency to coagulate or form a rope are collected and discharged substantially in the center of a pipe with a minimum resistance to flow.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a schematic view illustrating the measuring device of the present invention;

DESCRIPTION OF THE PREFERRED EMBODIMENTS

Figure 4:
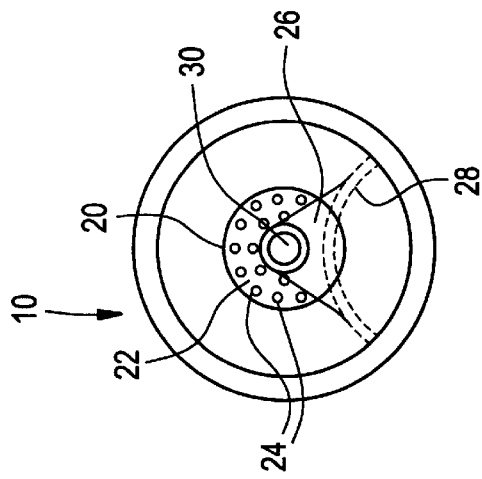
FIG. 4 is an end view taken along line 4—4 of FIG. 2.

Turning to the drawings wherein like reference numerals are used to indicate the same or similar features throughout the several views, FIG. 1 shows an enlarged section of pipe generally designated 10. A two phase fluid flow 50 enters the pipe 10 at the upstream end and passes through a bend 40. The two phase fluid is essentially separated into two distinct phases, a dense or solid (liquid) phase flow 52 and a light or fluid gas phase flow 54. The dense phase flow 52 separates to the external side of the bend 40 in the pipe 10 due to centrifugal forces while the light phase flow 54 continues through the pipe near the inside of the bend 40.

Once the flows 52 and 54 pass bend 40, a pressure measurement is taken at an upstream measurement point 12 by a pressure gauge (not shown). Located adjacent the bend 40 is perforated plate 22 having a plurality of perforations 24 therethrough and which is situated on top of nozzle 26 inside the pipe 10. Nozzle 26 has nozzle inlet 28 through which the dense phase flow 52 is directed. Perforated plate 22 is designed to provide sufficient pressure drop to induce the dense phase flow 52 flow forward through nozzle 26. The light phase flow 54 passes through the multiplicity of perforations 24 of perforated plate 22.

The two flows 52 and 54 then pass into the next section of pipe 10 by two different means. Dense phase flow 52 passes through nozzle 26 to nozzle outlet 30 which is located advantageously along the center line of a venturi tube 20. A second pressure gauge (not shown) connected to nozzle measurement point 14 measures the pressure adjacent the nozzle outlet 30, while venturi pressure point 16 has a third pressure gauge (not shown) connected to it to measure the pressure at the high velocity throat. The effect of the venturi tube 20 is to cause a thorough mixing of the separated phase flows 52 and 54 with a minimum amount of resistance into a mixed two phase flow 60 at the exit of the venturi tube 20. The mixed two phase flow 60 then passes by downstream measurement point 18 at which time the fourth pressure measurement is taken with a fourth pressure gauge (not shown).

Figure 2:
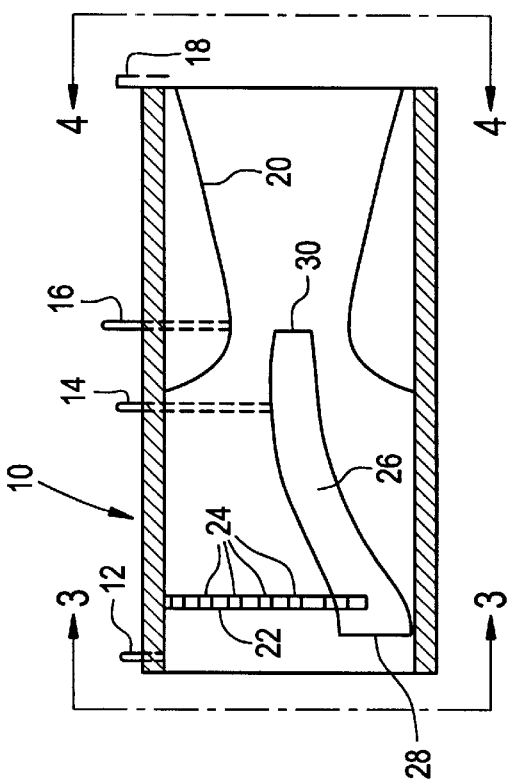
FIG. 2 is an elevational sectional view of the invention.

In FIG. 2 a smaller section of pipe 10 is shown. In this view, the nozzle 26 is shown having an arcuate shape. The nozzle 26 defines a path from the bottom or outside wall of pipe 10 to approximately the center of venturi 20. The nozzle 26 slopes inward from nozzle inlet 28 in an S-shaped curve to a central location at the entrance to venturi 20 and ends at nozzle outlet 30. The locations of the pressure measurement points 12, 14, 16, 18 are shown relative to the nozzle 26 and venturi 20. The perforated plate 22 is positioned slightly to the downstream side of nozzle inlet 28. The plate 22 surrounds nozzle 26 and is securely connected to the walls of pipe 10, leaving only nozzle inlet 28 and perforations 24 as openings to the downstream sections of the pipe 10.

Figure 3:
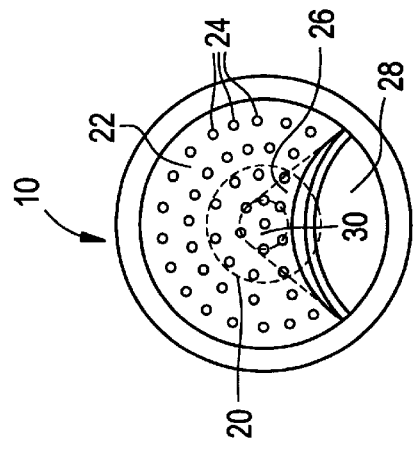
FIG. 3 is an end view taken along line 3—3 of FIG. 2.

FIG. 3 shows the location of the perforated plate 22 with a multiplicity of perforations 24 around nozzle 26 in more detail. The plate 22 surrounds nozzle 26 and is securely connected to the walls of pipe 10, leaving only nozzle inlet 28 and perforations 24 as openings to the downstream sections of the pipe 10.

FIG. 4 shows the location of nozzle outlet 30 located in the center of the venturi 20. The nozzle 26 tapers from wide opening at nozzle inlet 28 to a smaller diameter opening at nozzle outlet 30.

Figure 5:
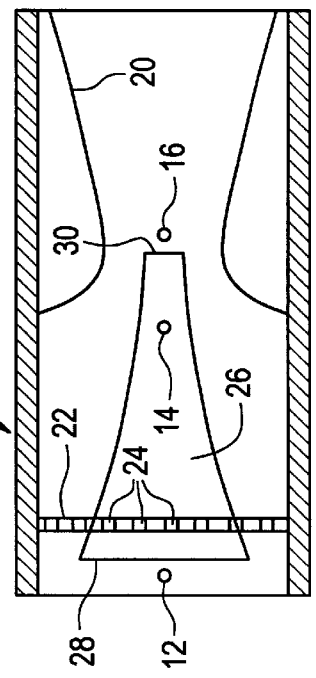
FIG. 5 is a top sectional view.

FIG. 5 shows the taper of the nozzle 26 from the top. Nozzle measurement point 14 is located advantageously inside the nozzle 26 where the flow velocity is maximized by the taper. Venturi measurement point 16 is placed adjacent the nozzle outlet 30 inside venturi 20, where some mixing of the separated flows 52, 54 occurs.

Additionally, perforated plate 22 can be seen spanning the width of pipe 10 over nozzle 26. Upstream measurement point 12 is located in close proximity to plate 22 and nozzle inlet 28 for obtaining a pressure measurement of the recently separated flows 52, 54.

Figure 6:
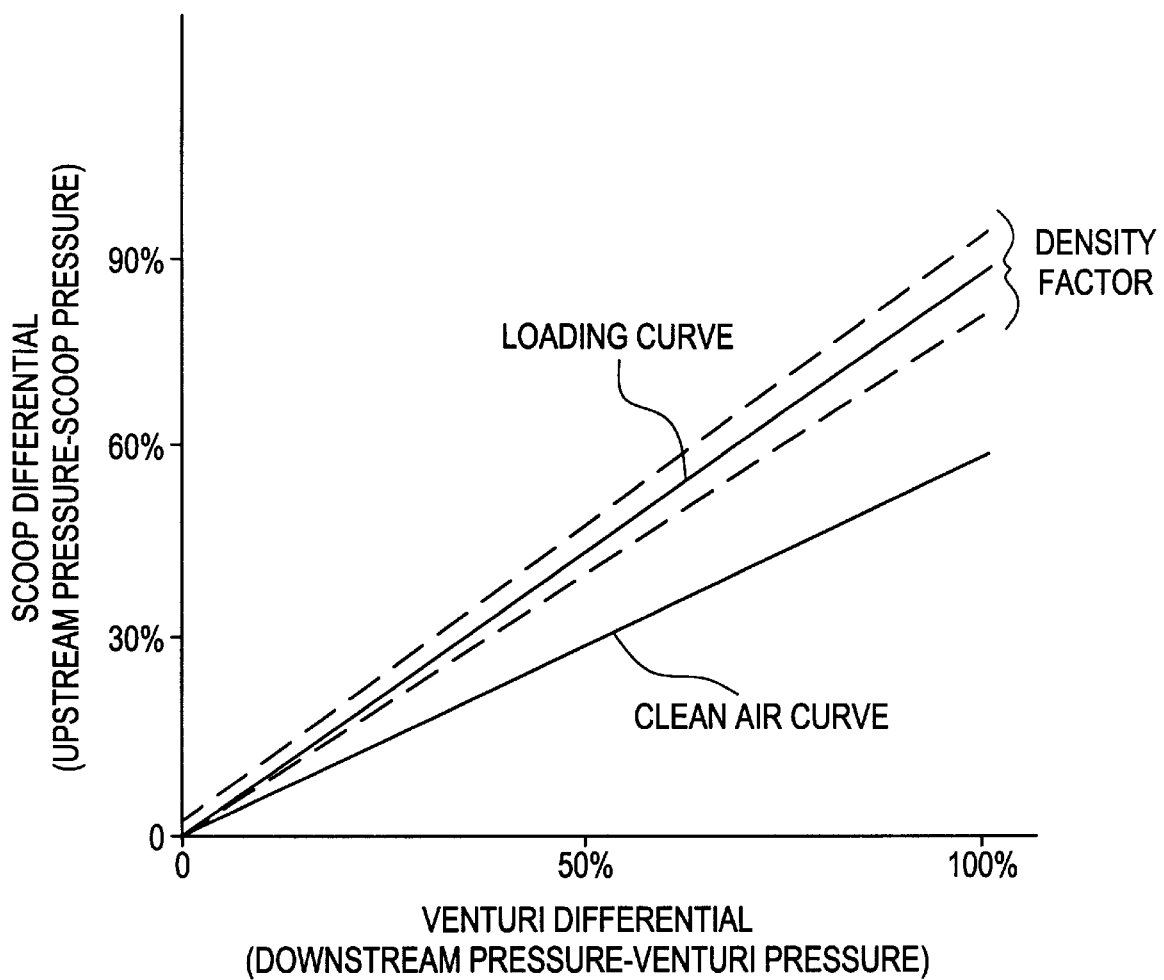
FIG. 6 is a graphic representation of the relative pressure measurements with respect to each other.

FIG. 6 is a graphical representation showing the relationship of the different flows to each other based on the pressure measurements taken within the pipe 10. The mass flow is calculated from the pressure measurements in the following way. The natural static pressure changes through the venturi create pressure differentials that are proportional to the square of the velocity which allow a calculation of mass flow. Static pressure differentials across the venturi nozzle and solid phase nozzle have a compound correlative relationship proportionate to the apparent density of the dense phase flow stream. The stream relationship of the differentials can be plotted as shown in the graph to show a dense phase and light phase flow relationship. By calibrating these differentials against known mass flow quantities they can subsequentially be used to obtain a relative flow measurement of each of the separate phase flows. Referring to the graph shown in FIG. 6, the venturi differential down-stream pressure reading minus venturi tube pressure reading would be calibrated to represent the light phase flow. The differential upstream pressure measurement minus the nozzle pressure measurement would represent gas and solid phase flow. Then by plotting the venturi differential against the nozzle differential, a relative index of solid phase flow may be established.

This arrangement of pressure measurement points and components within the pipe are especially useful for determining the phase flows when the two phases 52, 54 are a gas and a powdered solid or gas and liquid.

The invention can be used in conventional furnaces utilizing pulverized coal for fuel. The pipe 10 represents one of the pulverized coal fuel pipes that supply burners. The fuel pipes use primary air to convey pulverized coal to the burners.

This invention can also be used in natural occurring petroleum feed stocks when gas and liquid phase flow together. The two phase flow used with the invention could also consist of a dense phase of sand and light phase of water.

In pipe 10 the bend 40 and plate 22 separate the combined flow of primary air and coal into light and dense phases 54, 52, respectively. The two phases then flow through their respective paths and are recombined in the venturi 20 to continue on to the burner as combined flow 60.

While the primary air and pulverized coal flow through pipe section 10, the four pressure measurements are taken at measurement points 12, 14, 16, 18 by connected gauges. Using the four measurements, the relative flow of coal through the pipes can be determined, allowing better control of the system.

Also, the present invention may be easily retrofit in existing supply lines having a 90 degree bend by adding flanges to the pipe section shown in FIGS. 2 and 5. The flanges are fastened to mating flanges in a pipe or supply line that has a section removed. Alternatively, the pipe section shown in FIGS. 2 and 5 may be welded in place without flanges in a line that has a portion removed downstream a 90 degree bend.

Figure 7:
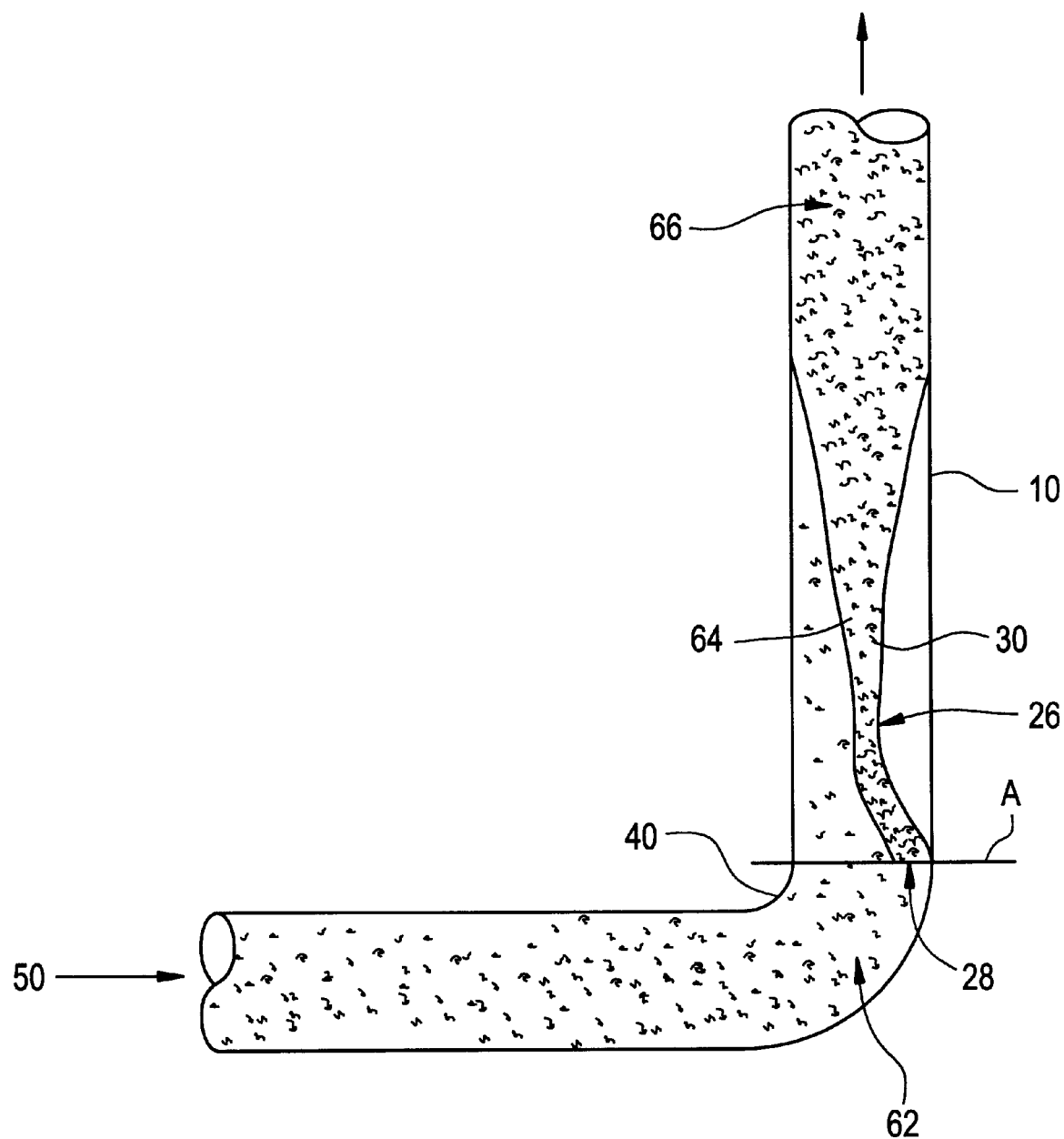
FIG. 7 is a schematic view illustrating the dispersion device of the present invention.

Referring next to FIG. 7, the present invention is also directed to a dispersion apparatus that provides uniform mixing and dispersion of a two phase flow. In a two phase flow 50 such as pulverized coal and air solids or liquids tend to coagulate and form a rope 62 downstream of bends or elbows that flows along one side of the pipe. Nozzle 26 which is a collection means operates as previously described to receive the dense phase fluid flow in the nozzle inlet 28. The nozzle 26 is shown having an arcuate shape. The nozzle 26 defines a path from the bottom or outside wall of pipe 10 to approximately the center of the pipe. The nozzle 26 slopes inward from nozzle inlet 28 in an S-shaped curve to substantially a central location in pipe 10 and ends at nozzle outlet 30. Preferably, the inlet 28 of nozzle 26 is positioned immediately downstream the curve of the bend at line A where pipe 10 straightens. Nozzle 26 allows the coagulated material to flow into the inlet 28 and then flow out the outlet 30 with a slight offset to reposition the discharge 64 substantially in the center of the pneumatic-transport pipe with a minimum resistance to flow. The taper of nozzle 26 allows some acceleration and/or deceleration as the case may be of the associated mass causing mixing and dispersion as it is reintroduced to the main flow stream. The coagulated material then disperses throughout the flow stream 66 as the two velocities adjust due to interface discontinuities. The combined mass 66 continues down the pneumatic conveyor transport pipe 10.

Figure 8:
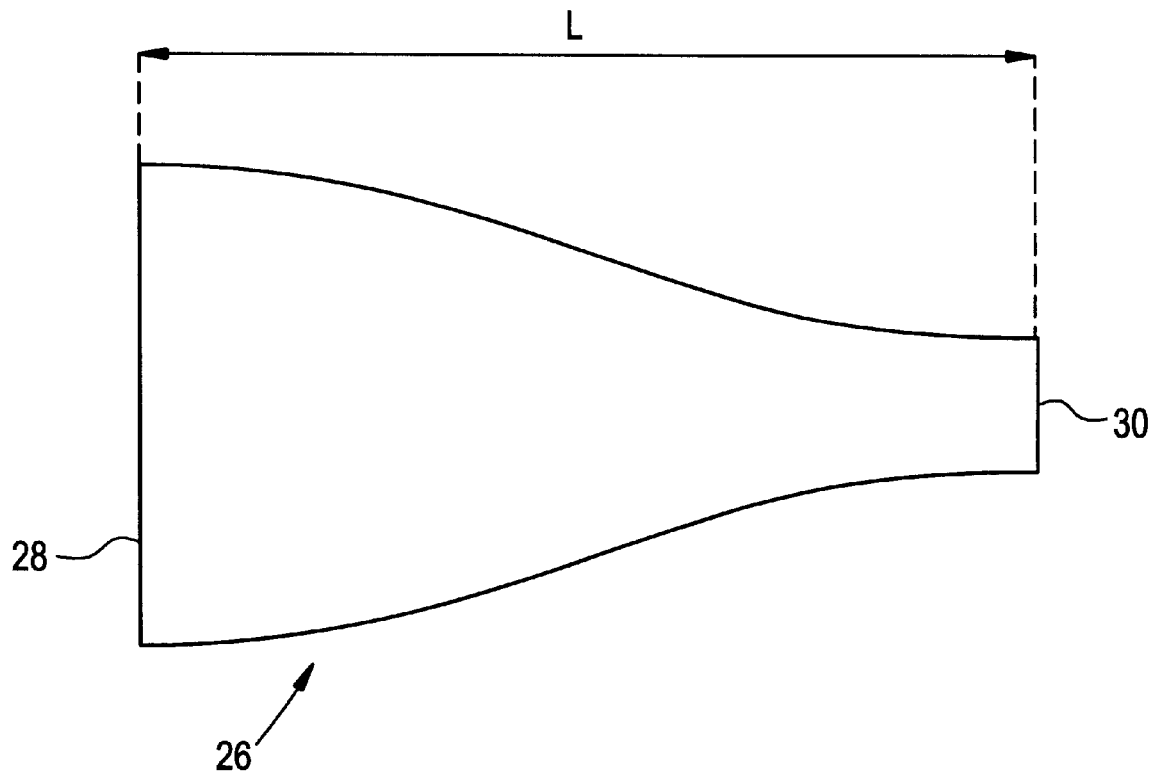
FIG. 8 is a top sectional view of the collection means according to the present invention.
Figure 9:
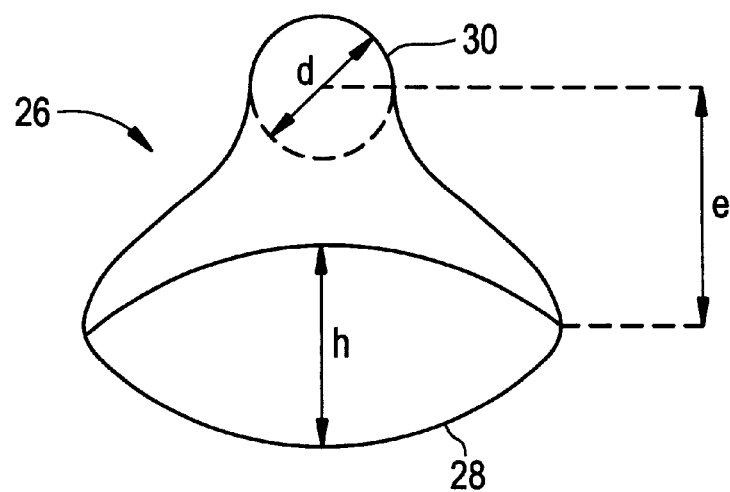
FIG. 9 is a front perspective view of the collection means according to the present invention.
Figure 10:
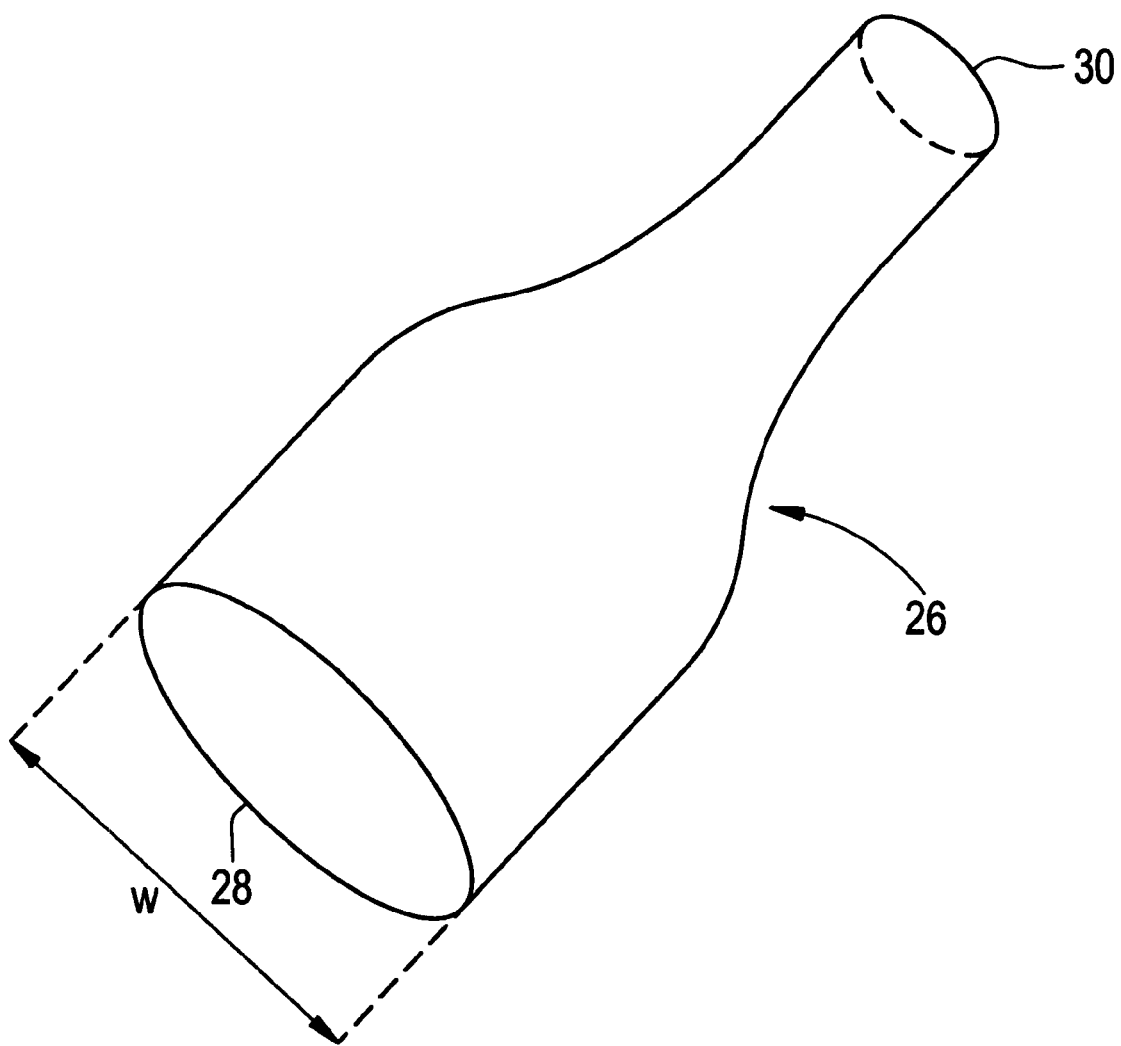
FIG. 10 is a side perspective view of the collection means according to the present invention.

FIGS. 8–10 show a preferred embodiment of nozzle 26 which has an inlet 28 somewhat oval in shape with an S-shaped body and a circular outlet 30.

For illustrative purposes only, the following dimensions apply to a 12 inch ID pneumatic transport line. The nozzle inlet 28 has a width w of about $8\tfrac{7}{32}$ inches and a height h of about $3\tfrac{1}{4}$ inches. The nozzle outlet 30 has a diameter d of about $2\tfrac{13}{32}$ inches. The elevation e of the nozzle from the inlet 28 to the outlet 30 is about $4\tfrac{1}{4}$ inch. The length L of the nozzle 26 is about $15\tfrac{5}{16}$ inches.

The advantages of the dispersion device of the instant invention is its effectiveness and energy efficiency. The pressure drop from the upstream to the downstream side of the nozzle is slightly greater than without it. This requires a minimum of energy compared to other devices. the streamlined shape of nozzle 26 offers a minimum of resistance to the coagulated material flowing in the pipe and results in a homogeneous mixture of the two phase flow.

While a specific embodiment of the invention has been shown and described in detail to illustrate the application of the principles of the invention, it will be understood that the invention may be embodied otherwise without departing from such principles.

We claim:

1. An apparatus for dispersing the relative flows of a two phase flow through a pipe having a longitudinal axis, an upstream end and a downstream end, and means for providing a two phase flow to the upstream end of the pipe, comprising:

means for substantially separating the two phase fluid flow into a dense phase and a light phase inside the pipe adjacent the upstream end; and nozzle means for collecting and transporting the dense phase separately through a first section of the pipe to a second section of the pipe downstream of the first section, said nozzle means being situated downstream of the separating means, said nozzle means having an arcuate shape with a substantially oval inlet adjacent an external wall of the pipe and an outlet substantially on a longitudinal axis of the pipe, the nozzle means being arcuate in shape, having a taper from the inlet to the outlet, and the inlet of the nozzle means having a larger opening than the outlet of the nozzle means.

2. An apparatus according to claim 1, wherein the outlet is substantially circular.

* * * * *